(12) United States Patent
Lesecq

(10) Patent No.: US 11,278,082 B2
(45) Date of Patent: Mar. 22, 2022

(54) SOLE STRUCTURES AND ARTICLES OF FOOTWEAR HAVING FLUID-FILLED BLADDER ELEMENTS

(71) Applicant: NIKE, Inc., Beaverton, OR (US)

(72) Inventor: Fiona Lesecq, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 164 days.

(21) Appl. No.: 16/773,797

(22) Filed: Jan. 27, 2020

(65) Prior Publication Data

US 2020/0245718 A1 Aug. 6, 2020

Related U.S. Application Data

(60) Provisional application No. 62/799,596, filed on Jan. 31, 2019.

(51) Int. Cl.
| A43B 13/20 | (2006.01) |
| A43B 13/18 | (2006.01) |
| A43B 21/28 | (2006.01) |

(52) U.S. Cl.
CPC ............ *A43B 13/20* (2013.01); *A43B 13/186* (2013.01); *A43B 21/28* (2013.01)

(58) Field of Classification Search
CPC ........ A43B 13/20; A43B 13/186; A43B 21/28
USPC .................................................... 36/29, 35 B
See application file for complete search history.

(56) References Cited

U.S. PATENT DOCUMENTS

| 5,572,804 | A | * | 11/1996 | Skaja | A43B 13/20 |
| | | | | | 36/29 |
| 5,575,088 | A | | 11/1996 | Allen et al. | |
| 5,755,001 | A | * | 5/1998 | Potter | A43B 21/28 |
| | | | | | 12/142 P |
| 5,771,606 | A | * | 6/1998 | Litchfield | A43B 13/203 |
| | | | | | 36/28 |
| 5,901,467 | A | * | 5/1999 | Peterson | A43B 13/20 |
| | | | | | 36/29 |
| 6,029,962 | A | * | 2/2000 | Shorten | B29C 49/0047 |
| | | | | | 267/145 |
| 6,158,149 | A | * | 12/2000 | Rudy | A43B 13/206 |
| | | | | | 36/29 |

(Continued)

FOREIGN PATENT DOCUMENTS

| CN | 204742804 U | 11/2015 |
| EP | 1 354 527 A1 | 10/2003 |

OTHER PUBLICATIONS

International Search Report and Written Opinion, dated Apr. 29, 2020, for International Patent Application No. PCT/US2020/015246, 14 pages.

*Primary Examiner* — Marie D Bays
(74) *Attorney, Agent, or Firm* — Klarquist Sparkman, LLP

(57) ABSTRACT

An article of footwear can include a midsole with a lower surface having a first recessed portion and an outsole coupled to the lower surface of the midsole, with the outsole having an upper surface with a second recessed portion. A first bladder element and a second bladder element can be provided in a stacked arrangement between the midsole and outsole, with an upper portion of the first bladder element that contacts the lower surface of the midsole and extends at least partially into the first recessed portion and a lower portion of the second bladder element that contacts the upper surface of the outsole and extends at least partially into the second recessed portion.

14 Claims, 11 Drawing Sheets

(56) References Cited

U.S. PATENT DOCUMENTS

| | | | |
|---|---|---|---|
| 6,253,466 B1 | 7/2001 | Harmon-Weiss et al. | |
| 6,385,864 B1 * | 5/2002 | Sell, Jr | A43B 13/20 |
| | | | 36/29 |
| 6,402,879 B1 * | 6/2002 | Tawney | B29D 22/02 |
| | | | 156/292 |
| 6,843,000 B1 | 1/2005 | Park | |
| 8,943,709 B2 | 2/2015 | Aveni et al. | |
| 2005/0028403 A1 * | 2/2005 | Swigart | A43B 13/20 |
| | | | 36/28 |
| 2014/0075778 A1 | 3/2014 | Bruce et al. | |
| 2014/0075779 A1 | 3/2014 | Bruce et al. | |
| 2015/0033577 A1 * | 2/2015 | Dahl | A43B 13/181 |
| | | | 36/28 |
| 2018/0338577 A1 * | 11/2018 | Elder | B32B 27/08 |
| 2018/0338578 A1 * | 11/2018 | Elder | B32B 3/12 |
| 2020/0154826 A1 * | 5/2020 | Case | A43B 13/206 |
| 2020/0245718 A1 * | 8/2020 | Lesecq | B29D 35/142 |

* cited by examiner

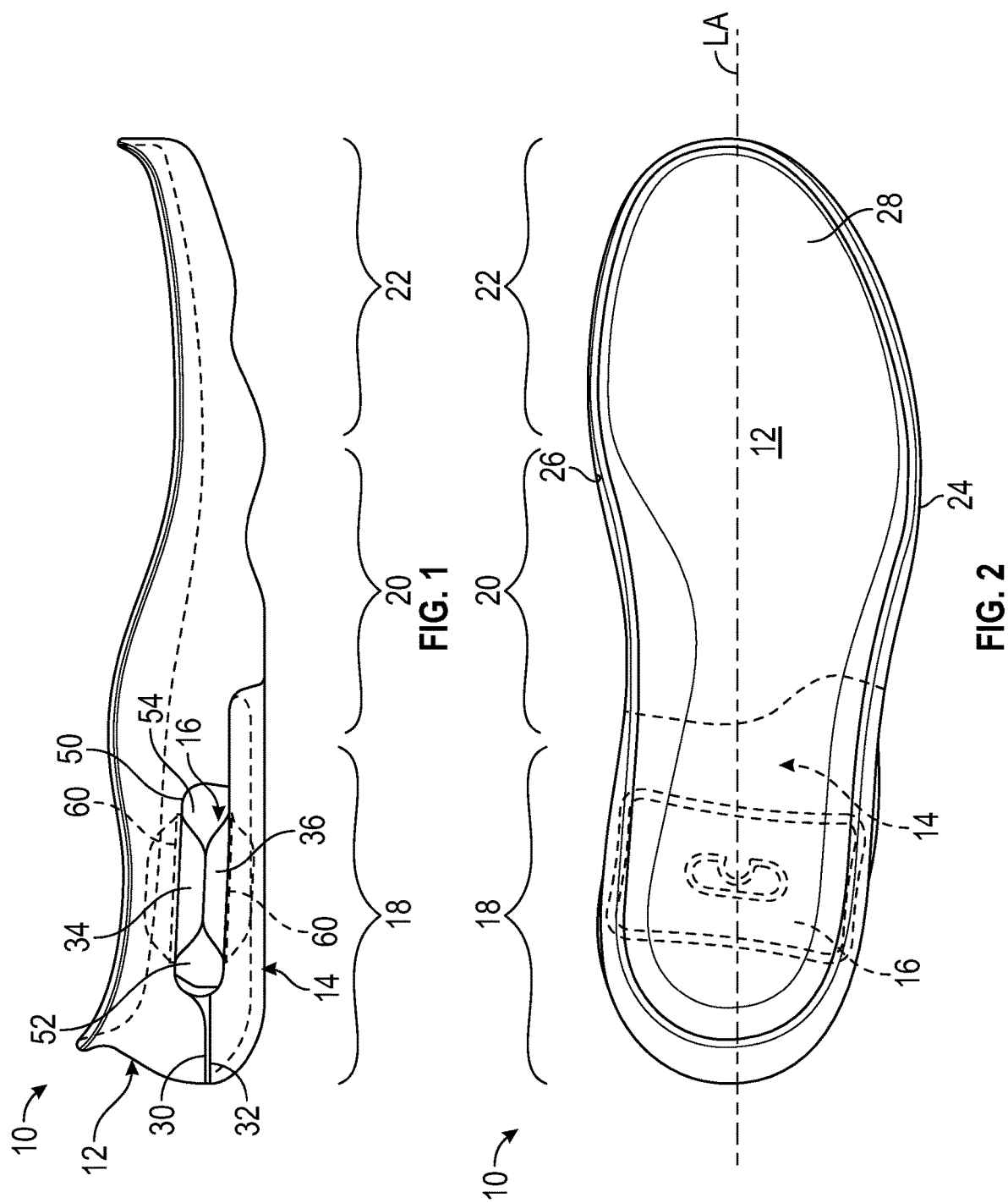

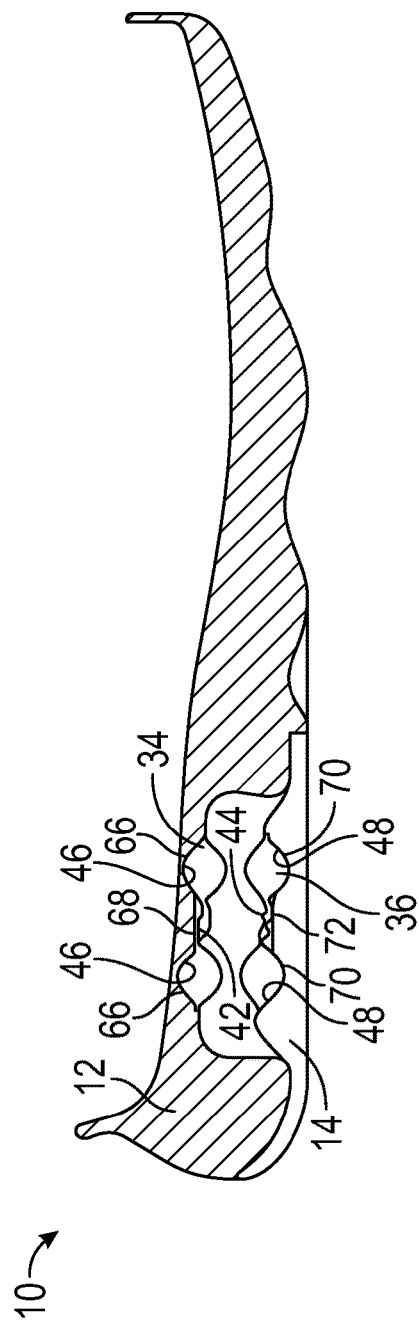
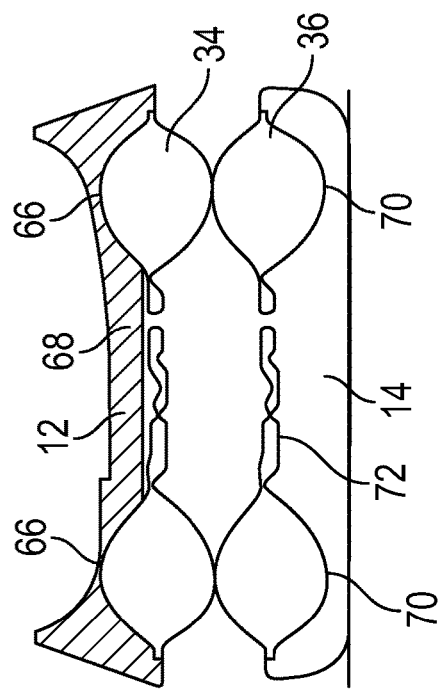

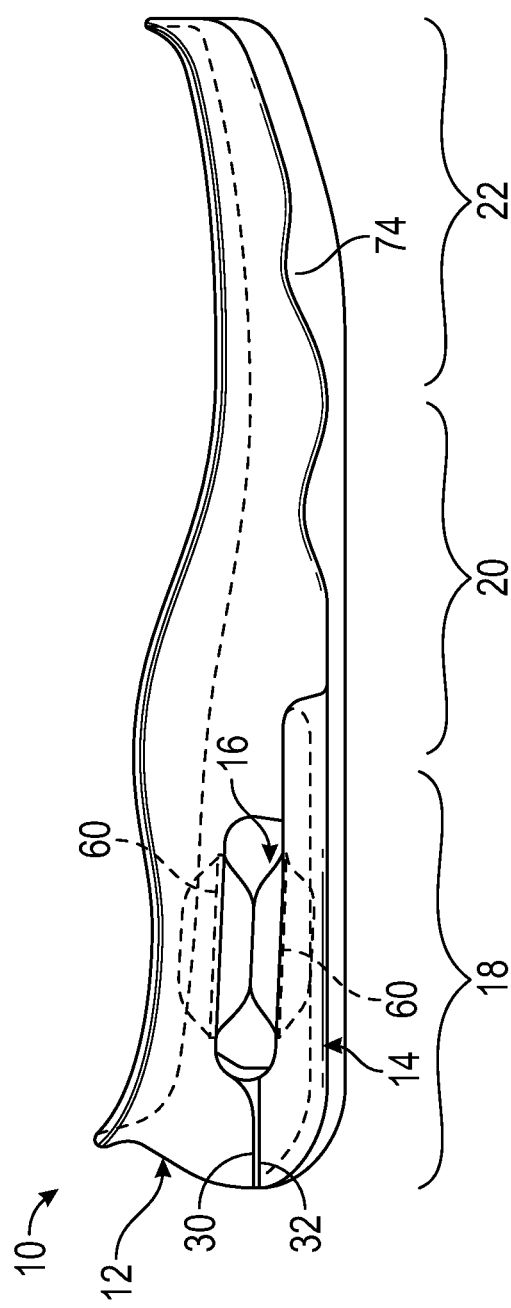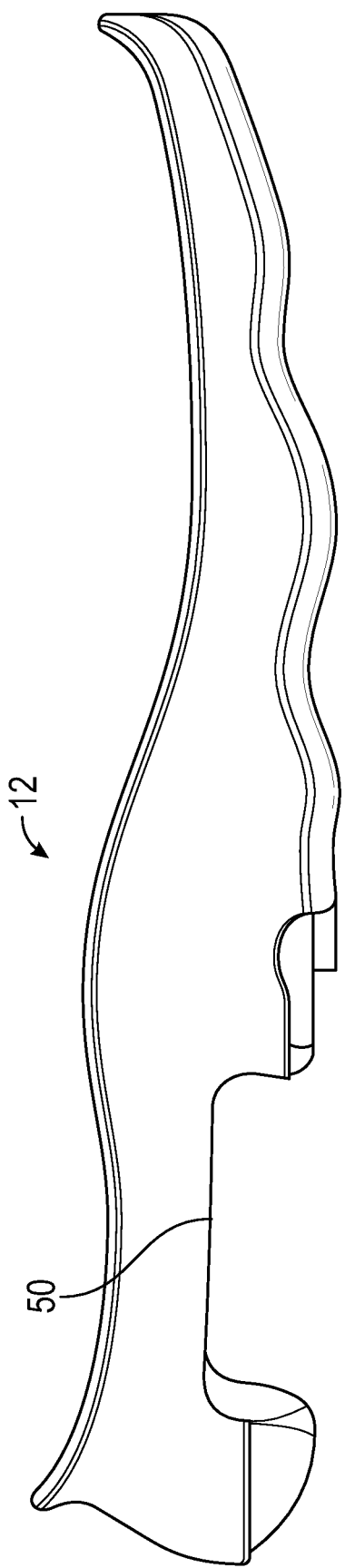

SOLE STRUCTURES AND ARTICLES OF FOOTWEAR HAVING FLUID-FILLED BLADDER ELEMENTS

CROSS REFERENCE TO RELATED APPLICATION

This application claims the benefit of U.S. Provisional Application No. 62/799,596, filed Jan. 31, 2019. U.S. Provisional Application No. 62/799,596 is incorporated herein by reference in its entirety.

FIELD

This disclosure is directed to cushioning systems in articles of footwear and, more particularly, to sole structures with fluid-filled bladder elements.

BACKGROUND

Articles of footwear can include cushioning systems to enhance the performance of the article and/or the comfort of the wearer. Continued improvements in cushioning systems for articles of footwear are desirable.

BRIEF DESCRIPTION OF THE DRAWINGS

FIG. 1 is a lateral side view of a sole assembly having a cushioning system.

FIG. 2 is a top view of the sole assembly shown in FIG. 1.

FIG. 9 is a cross-sectional view taken from FIG. 3.

FIG. 10 is a cross-sectional view taken from FIG. 3.

FIG. 11 is a side view of another embodiment of a sole assembly having a cushioning system.

FIG. 12 is a side view of a midsole of an exemplary sole assembly.

DETAILED DESCRIPTION

General Considerations

Figure 3:
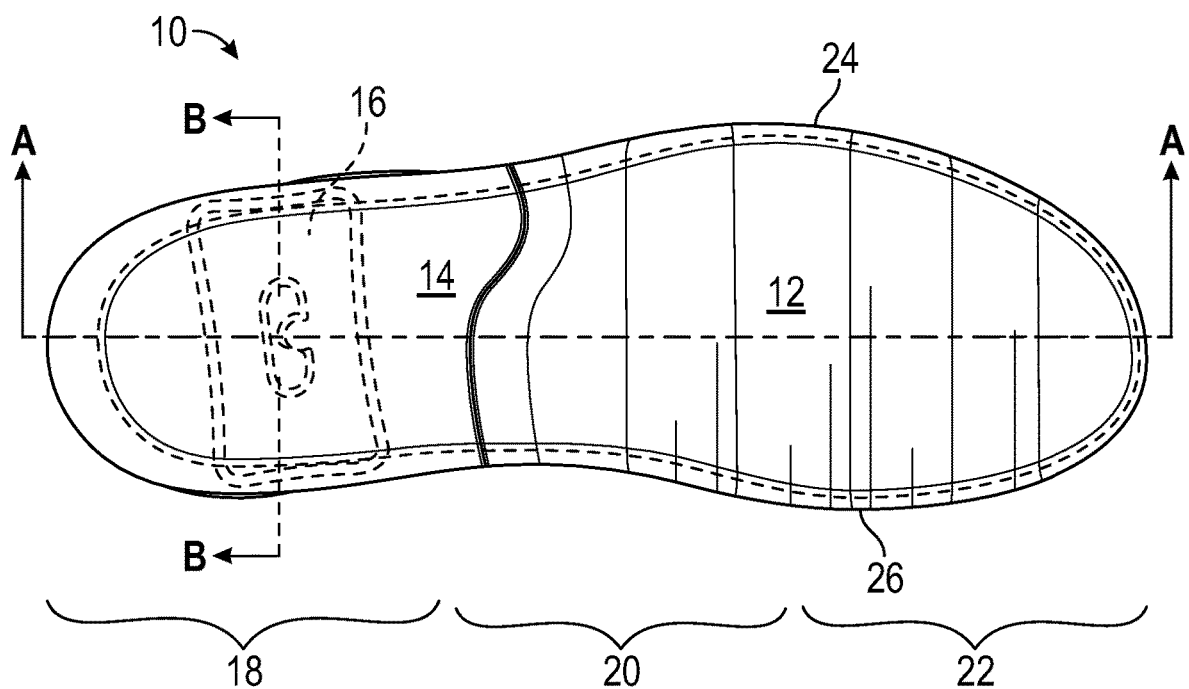
FIG. 3 is a bottom view of the sole assembly shown in FIG. 1.

The systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

As used in this application the singular forms "a," "an," and "the" include the plural forms unless the context clearly dictates otherwise. Additionally, the term "includes" means "comprises." Further, the term "coupled" or "secured" encompasses mechanical and chemical couplings, as well as other practical ways of coupling or linking items together, and does not exclude the presence of intermediate elements between the coupled items unless otherwise indicated, such as by referring to elements, or surfaces thereof, being "directly" coupled or secured. Furthermore, as used herein, the term "and/or" means any one item or combination of items in the phrase.

As used herein, the term "exemplary" means serving as a non-limiting example, instance, or illustration. As used herein, the terms "e.g.," and "for example," introduce a list of one or more non-limiting embodiments, examples, instances, and/or illustrations.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide," "produce," "determine," and "select" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As used herein, the directional terms (e.g., "upper" and "lower") generally correspond to the orientation of an article of footwear or sole assembly as it is configured to be worn by a wearer. For example, an "upwardly-facing surface" and/or an "upper surface" of a sole assembly refers to the surface oriented in the "superior" anatomical direction (i.e., toward the head of a wearer) when the article of footwear is being worn by the wearer. Similarly, the directional terms "downwardly" and/or "lower" refer to the anatomical direction "inferior" (i.e., toward the ground and away from the head of the wearer). "Front" means "anterior" (e.g., towards the toes), and "rear" means "posterior" (e.g., towards the heel). "Medial" means "toward the midline of the body," and "lateral" means "away from the midline of the body."

Although the figures may illustrate an article of footwear intended for use on only one foot (e.g., a right foot) of a wearer. One skilled in the art will recognize that a corresponding article of footwear for the other foot (e.g., a left foot) would be a mirror image of the right article of footwear.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, claims, abstract, and drawings.

The Disclosed Technology

Various sole structures and articles of footwear that include cushioning systems, as well as methods of manufacturing the same, are disclosed herein.

In some embodiments, an article of footwear can include a midsole with a lower surface having a first recessed portion and an outsole coupled to the lower surface of the midsole, with the outsole having an upper surface with a second recessed portion. The article of footwear can include a first bladder element and a second bladder element, each having at least one chamber filled with a fluid (e.g., a gas). The first bladder element can have an upper portion that contacts the lower surface of the midsole and extends at least partially into the first recessed portion, and the second bladder element can have a lower portion that contacts the upper surface of the outsole and extends at least partially into the second recessed portion.

In some embodiments, the first bladder element can have a first internal depression and the second bladder element a second internal depression, and the first recessed portion can include a first projection that extends downward from the first recessed portion into the first internal depression and the second recessed portion can include a second projection that extends upward from second recessed portion into the second internal depression.

In other embodiments, a window extends between a lateral side and a medial side of the article of footwear, and the window is collectively defined by at least a lower edge of the midsole and an upper edge of the outsole. A first exposed portion of the first bladder element and a second exposed portion of the second bladder element can be visible from a lateral and/or medial side of the window, with a first unexposed portion of the first bladder element and a second unexposed portion of the second bladder element being not exposed (e.g., covered by the midsole or outsole, respectively).

In some embodiments, the window can be in a heel region of the article of footwear. In other embodiments, a first peripheral bond of the first bladder element and a second peripheral bond of the second bladder element are in the unexposed portions (e.g., covered by the midsole or outsole, respectively). In some embodiments, the first internal depression can be formed from a first internal weld area of the first bladder element and the second internal depression can be formed from a second internal weld area of the second bladder element.

The outsole can extend along an entire length of the article of footwear, or form only a portion of a ground-contacting surface of the article of footwear. For example, the outsole can extend across the heel region of the article of footwear. In some embodiments, the outsole can have a notched portion that engages with the midsole and/or a portion of a second outsole member.

The upper portion of the first bladder element can be secured to the lower surface of the midsole and the lower portion of the second bladder element can be secured to the upper surface of the outsole. Similarly, a lower surface of the first bladder element can be secured (e.g., adhered) to an upper surface of the second bladder element. In some embodiments, the first and second exposed portions are spaced apart from a heel side of the window and from a forefoot side of the window and a heel-side aperture is defined between the heel side of the window and the first and second exposed portions and a forefoot-side aperture is defined between the forefoot side of the window and the first and second exposed portions. An upper can be secured to the midsole and/or outsole.

In some embodiments, a sole structure comprises a midsole and outsole as described above and the sole structure can be secured to an upper to form an article of footwear.

In another embodiment, a method of manufacturing an article of footwear is provided. The method includes forming a midsole with a first recessed portion in a lower surface of the midsole and a first projection extending from the first recessed portion, forming an outsole with a second recessed portion in an upper surface of the outsole and a second projection extending from the second recessed portion, positioning an upper portion of a first bladder element in contact with the lower surface of the midsole with the first bladder element extending at least partially into the first recessed portion and with the first projection being received in a first depression in an internal area of the first bladder element, positioning a lower portion of a second bladder element in contact with the upper surface of the outsole with the second bladder element extending at least partially into the second recessed portion and with the second projection being received in a second depression in an internal area of the second bladder element, and securing an upper surface of the outsole to a lower surface of the midsole.

In some embodiments, the method can also include securing the upper portion of the first bladder element to the lower surface of the midsole and securing the lower portion of the second bladder element to the upper surface of the outsole. A lower surface of the first bladder element can also be secured to an upper surface of the second bladder element (e.g., with an adhesive).

In some embodiments, the act of securing the upper surface of the outsole to the lower surface of the midsole forms a window that extends between a lateral side and a medial side of the article of footwear, the window being collectively defined by at least a lower edge of the midsole and an upper edge of the outsole. The act of positioning the first bladder element can include exposing a first exposed portion of the first bladder through the window and covering first unexposed portion of the first bladder element so that it is not exposed (e.g., the first unexposed portion can be covered by the midsole), and the act of positioning the second bladder element can include exposing a second exposed portion of the second bladder element through the window and covering a second unexposed portion of the second bladder element so that it is not exposed (e.g., the second unexposed portion can be covered by the sole). The first and second unexposed portions can include portions of the first and second bladder elements, respectively, where a peripheral bond is located.

In some embodiments, the first and second recessed portions can be formed in a heel region of the article of footwear. A first internal depression can be formed from a first internal weld area of the first bladder element and a second internal depression can be formed from a second internal weld area of the second bladder element.

The outsole can extend along an entire length of the article of footwear or the outsole can form forms only a portion of a ground-contacting surface of the article of footwear such that securing the upper surface of the outsole to the lower surface of the midsole covers only a portion of the lower surface of the midsole. If the outsole forms only a portion of the ground-contacting surface, the outsole can be a first outsole member in a heel region of the article of footwear, and the method can include securing a second outsole member to the article of footwear. An upper can be secured to the midsole and/or outsole, which collectively can be considered a sole structure or sole assembly.

Exemplary Embodiments of Sole Assemblies and Articles of Footwear

Articles of footwear (also referred to herein as "articles") can include running shoes, soccer shoes, football shoes, rugby shoes, basketball shoes, baseball shoes, tennis shoes, sneakers, boots, sandals, dress shoes, work shoes, and any other type of footwear to which the cushioning systems disclosed herein may be applied. Articles of footwear typically include a sole structure, also referred to as a sole assembly herein, and an upper coupled to the sole structure. The upper forms an interior void configured to receive a foot of a wearer.

FIGS. 1-3 illustrate a sole assembly 10 for use with an article of footwear. Sole assembly 10 include a midsole 12 and an outsole 14. A bladder system 16 is positioned between midsole 12 and outsole 14.

Portions of the sole assembly (and the corresponding article of footwear) may be identified based on regions of the foot located at or near that portion of the article of footwear when the footwear is worn on the properly sized foot. For example, as shown in FIG. 1, an article of footwear and/or a sole assembly may be considered as having a heel region 18 at the rear of the foot, a midfoot region 20 at the middle or arch area of the foot, and a forefoot region 22 at the front of the foot. Footwear and/or sole assemblies also include a lateral side 24 (the "outside" or "little toe side" of the foot) and a medial side 26 (the "inside" or "big toe side" of the foot). The lateral and medial sides of the footwear extend through the forefoot, midfoot, and heel regions and generally correspond with opposite sides of the footwear (and may be considered as being separated by a central longitudinal axis LA).

Midsole 12 can be formed of any suitable material. For example, midsole 12 can be formed from a resilient, polymer foam material, such as polyurethane foam or ethylvinylacetate ("EVA") foam, that extends throughout the length of the article of footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. The top surface 28 of the midsole 12 can be contoured, e.g., to comfortably support and/or help position a plantar surface of a wearer's foot. As discussed in more detail herein, midsole 12 can be attached to an upper.

Outsole 14 is a ground-contacting member and that can be formed, for example, of a durable, wear resistant material that includes texturing or other features to improve traction. For example, outsole 14 can be formed of rubber, phylon, phyllite, thermoplastic polyurethane, and other suitable materials.

As shown in FIG. 1, outsole 14 can be secured to a bottom surface 30 of midsole 12. For example, a top surface 32 of outsole 14 can engage with the bottom surface 30 of midsole 12, and the two surfaces can be secured together, such as with an adhesive.

FIGS. 4-8 illustrate a bladder system 16 that comprises a pair of fluid-filled bladder elements 34, 36 that are stacked with bladder element 34 on top of bladder element 36. Each of the bladder elements defines a respective sealable internal cavity 38, 40. Bladder elements 34, 36 can be formed with at least one upper recessed portion 42 and at least one lower recessed portion 44. The at least one upper recessed portion 42 and at least one lower recessed portion 44 are surrounded, respectively, by an upper peripheral surface 46 and a lower peripheral surface 48 that extend above recessed portions 42 and below recessed portion 44, respectively. Thus, the recessed portions 42, 44 (also referred to herein as depressions) of the bladder elements include surfaces that are spaced apart from a peripheral surface and which are lower in height than the upper peripheral surface or higher in height than the lower peripheral surface.

Figure 4:
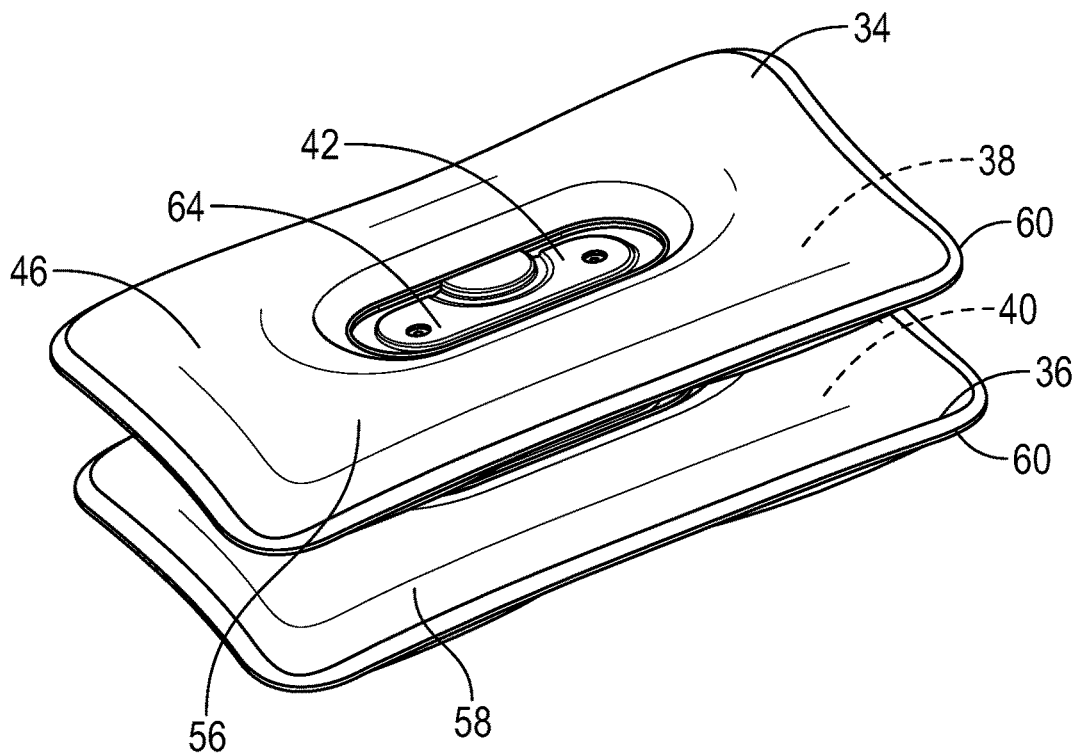
FIG. 4 is a perspective view of a pair of stacked bladder elements.

As shown in FIG. 4, upper and lower peripheral surfaces 46, 48 extend entirely around a periphery of bladder elements 34, 36 to completely enclose upper and lower recessed portions 42, 44. However, in some embodiments, peripheral surfaces 46, 48 can only partially surround the upper and/or lower recessed portions (e.g., such as by forming a horseshoe shape with one side of the upper and/or lower recessed portions not surrounded by the upper and/or lower peripheral surface).

Referring again to FIG. 1, midsole 12 and outsole 14 are shaped to collectively define a window 50 (e.g., a gap or cutout) through sole assembly 10. Window 50 extends from the lateral side 24 to the medial side 26 in the heel region 18 of sole assembly 10. Bladder system 16 is received between midsole 12 and outsole 14 so that only a portion of each of bladder elements 34, 36 are visible from the medial and lateral sides of the sole assembly.

For example, as shown in FIG. 1, each of the bladder elements 34, 36 has an exposed portion and an unexposed portion. The unexposed portion of first bladder element 34 includes an upper portion that is not visible through window 50 (e.g., as shown in dashed lines). The unexposed portion includes the area of first bladder element 34 where a peripheral bond 60 (discussed below) is located. Similarly, the unexposed portion of second bladder element 36 includes a lower portion that is not visible through window 50 (e.g., as shown in dashed lines), which includes an area of second bladder element 36 where its peripheral bond 60 is located.

Figure 6:
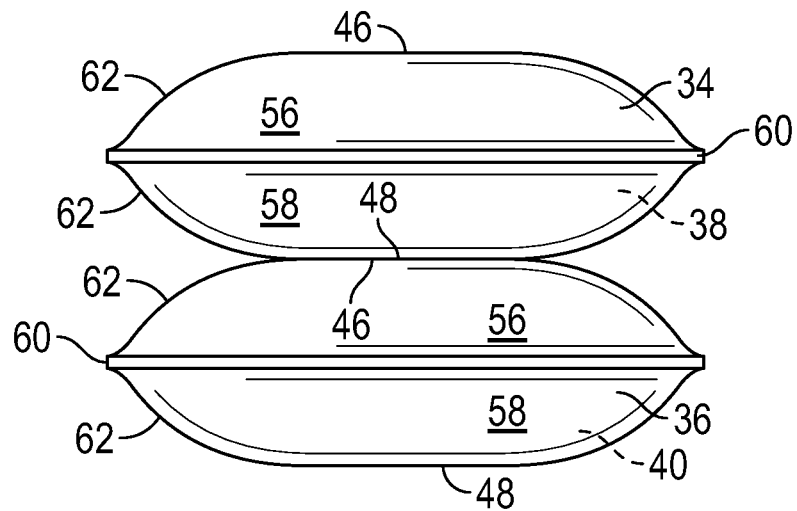
FIG. 6 is a side view of the stacked bladder elements shown in FIG. 4.

When viewed from the lateral or medial side, as shown in FIGS. 1 and 6, adjacent peripheral surfaces of the stacked bladder elements 34, 36 (i.e., lower peripheral surface 48 of bladder element 34 and upper peripheral surface 46 of bladder element 36) contact each other along their lateral and medial side surfaces.

In some embodiments, as shown in FIG. 1, window 50 can be sized so that bladder elements 34, 36 do not extend the entire length of window 50. For example, FIG. 1 illustrates a rear gap 52 and a front gap 54 on the rear and front sides, respectively, of bladder elements 34, 36. Rear gap 52 and front gap 54 can provide unobstructed views though window 50 from the medial side to the lateral side, and vice versa.

Bladder elements 34, 36 can be formed in various manners. For example, each bladder element can be formed by securing a first polymeric sheet 56 to a second polymeric sheet 58 to define the respective internal cavity 38, 40. First and second polymeric sheets 56, 58 are substantially impermeable to the fluid to be contained within cavities 38, 40. First polymeric sheet 56 and second polymeric sheet 58 can be coupled together (e.g., welded) around their respective peripheries to form a peripheral bond 60.

Figure 5:
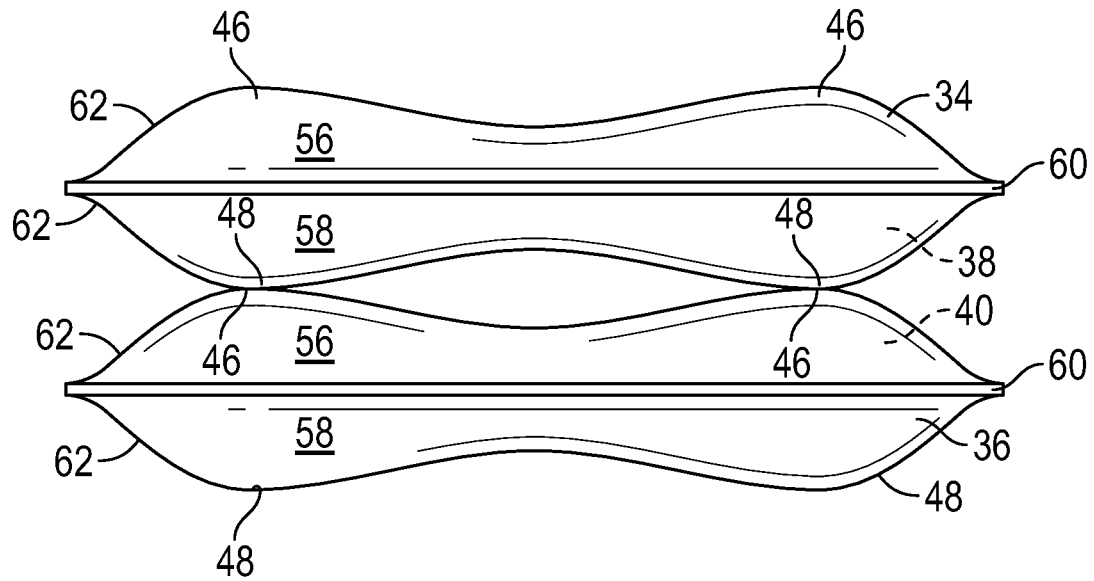
FIG. 5 is a front view of the stacked bladder elements shown in FIG. 4.

As shown in FIG. 5, first polymeric sheet 56 forms the upper peripheral surface 46 and a portion of a sidewall 62 of bladder element 34, and second polymeric sheet 58 forms the lower peripheral surface 48 and another portion of sidewall 62 of bladder element 34. Peripheral bond 60 can be located at a midpoint of sidewall 62 or, alternately, positioned closer to the lower peripheral surface 48 or the upper peripheral surface 46.

Bladder elements can be thermoformed in a mold assembly, with the first and second polymeric sheets 56, 58 being vacuum formed to the shape of the mold assembly during the thermoforming process. The sheets can be bonded to one another to form the peripheral bond by compression during the thermoforming process and fluid can be provided to the internal cavity of the bladder element through a fill tube. After inflation of the bladder element, the fill tube can be plugged and subsequently trimmed prior to assembling the sole assembly or article of footwear. As used herein, a "fluid" includes a gas, including air, an inert gas such as nitrogen, or another gas.

Figure 7:
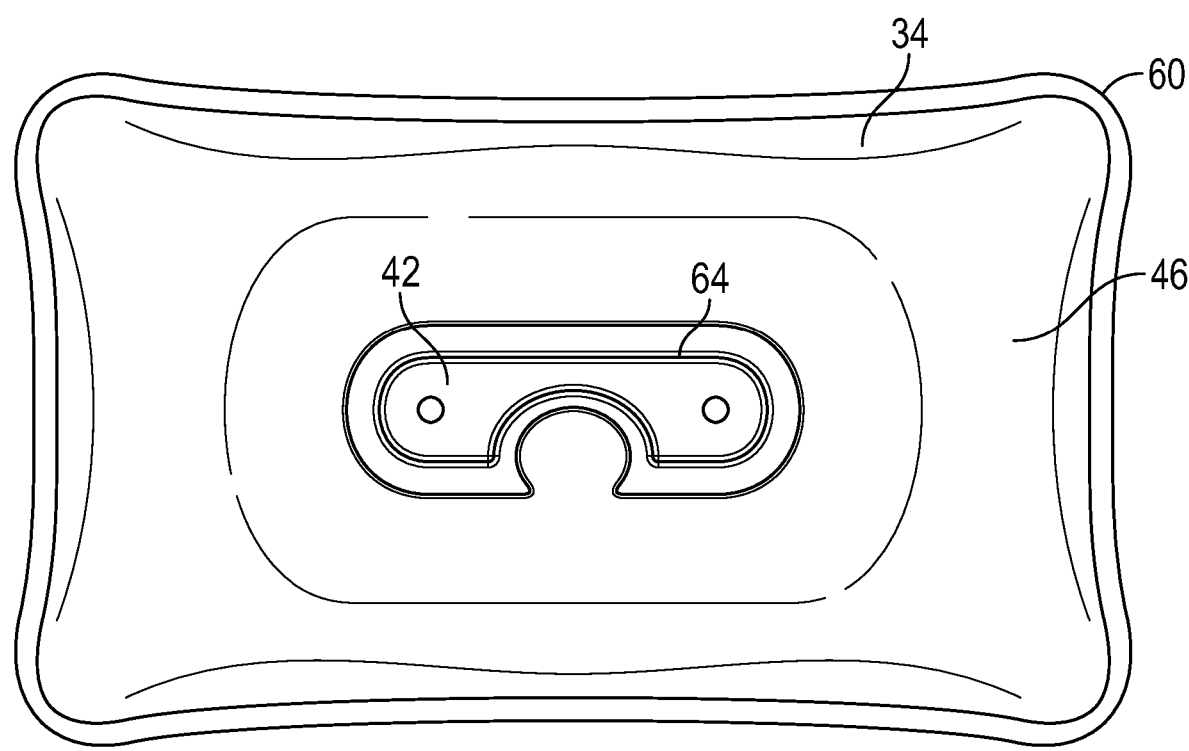
FIG. 7 is a top view of the stacked bladder elements shown in FIG. 4.
Figure 8:
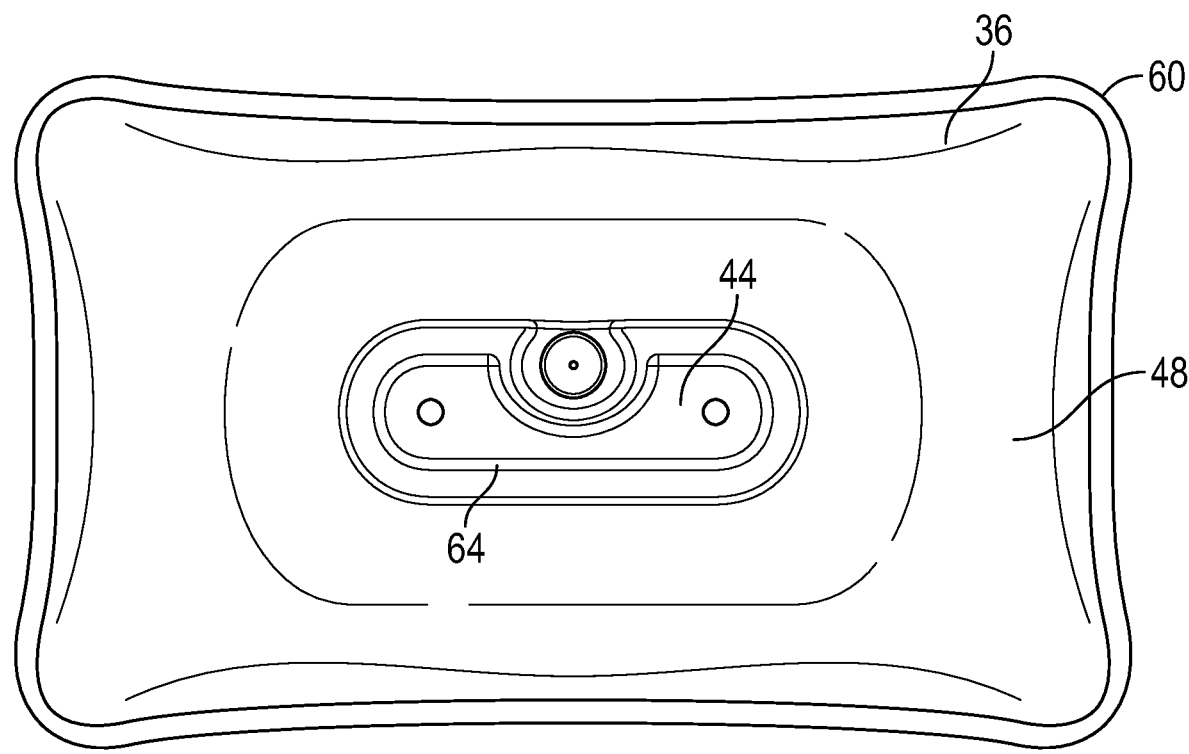
FIG. 8 is a bottom view of the stacked bladder elements shown in FIG. 4.

In addition to the peripheral bond 60, first and second polymeric sheets 56, 58 can be welded together at one or more internal areas to achieve a desired shape and configuration of the bladder element. For example, as shown in FIGS. 7 and 8, upper and lower recessed portions 42, 44 can be formed by bonding the first and second polymeric sheets 56, 58 together at an interior bond region 64 (e.g., internal weld area) that is spaced away from the peripheral surfaces 46, 48. When an interior bond region is formed on both sides of the bladder element, as shown in FIGS. 7 and 8, for example, the terms interior bond region and interior weld area refer to regions on either the top or bottom of a bladder element.

As shown in FIGS. 9 and 10, midsole 12 and outsole 14 can be sized to receive a respective bladder element 34, 36. For example, midsole 12 can comprise a peripheral recessed portion 66 and raised surface, such as one or more projections 68 extending downward relative to recessed portion 66. Outsole 14 can likewise comprise a peripheral recessed portion 70 and a central raised surface, such as one or more projections 72 extending upward relative to recessed portion 70. Peripheral recessed portion 66 is sized to engage with upper peripheral surface 46 of bladder element 34 and projection 68 is sized to engage with upper recessed portion 42. Similarly, peripheral recessed portion 70 is sized to engage with lower peripheral surface 48 of bladder element 34 and projection 72 is sized to engage with lower recessed portion 44.

By providing mating surfaces in this manner (e.g., projections extending into recessed portions of the bladder elements and peripheral surfaces of the bladder elements into recessed portions of the midsole/sole), the bladder elements can be better secured in a desired position. In addition to a friction fit between the bladder elements and adjacent surfaces of the midsole and outsole, adhesives can be provided to further secure these elements in position relative to each other. Also, because of the non-linear shapes of the adjacent surfaces described above, in some embodiments, a greater amount of surface area may be available for applying adhesives.

Referring again to FIG. 1, the recessed portions of the midsole and outsole are preferably sized to accommodate the peripheral bonds of respective bladder elements entirely within the respective midsole or outsole region, such that the peripheral bond is not exposed by window 50. For example, peripheral bond 60 of bladder element 34 is received within the midsole 12 (i.e., an internal surface of midsole 12 contacts and/or covers peripheral bond 60) so that it is not exposed by window 50, and peripheral bond 60 of bladder element 36 is received within the outsole 14 (i.e., an internal surface of outsole 14 contacts and/or covers peripheral bond 60) so that it is not exposed by window 50. Receiving the peripheral bonds 60 of the bladder elements within the midsole and outsole elements as shown in FIG. 1, can improve both the function and aesthetics of the article of footwear. For example, exposed peripheral bonds may be more susceptible to failing by undesired contact with external elements as well as less desirable to view through window 50.

FIG. 1 illustrates outsole 14 as a "cap" that covers only the heel region 18 with the midsole 12 directly contacting the ground in the midfoot region 20 and forefoot region 22. Alternatively, outsole 14 can extend the entire length of the bottom of sole assembly 10 as shown in FIG. 11. In particular, FIG. 11 illustrates a second outsole member 74. Second outsole member 74 can be integrally formed with outsole 14, with both collectively forming an outsole structure joined to midsole 12. In other embodiments, second outsole member 74 can be separate from outsole 14 and secured to the midsole 12 separately from outsole 14—either before, after, or during the securing of outsole 14 to midsole 12. Second outsole member 74 can extend the length of sole assembly 10 or it can only in a midfoot 20 or forefoot region 22 (e.g., extending from a forward portion of outsole 14 to the toe side of sole assembly 10).

Figure 13:
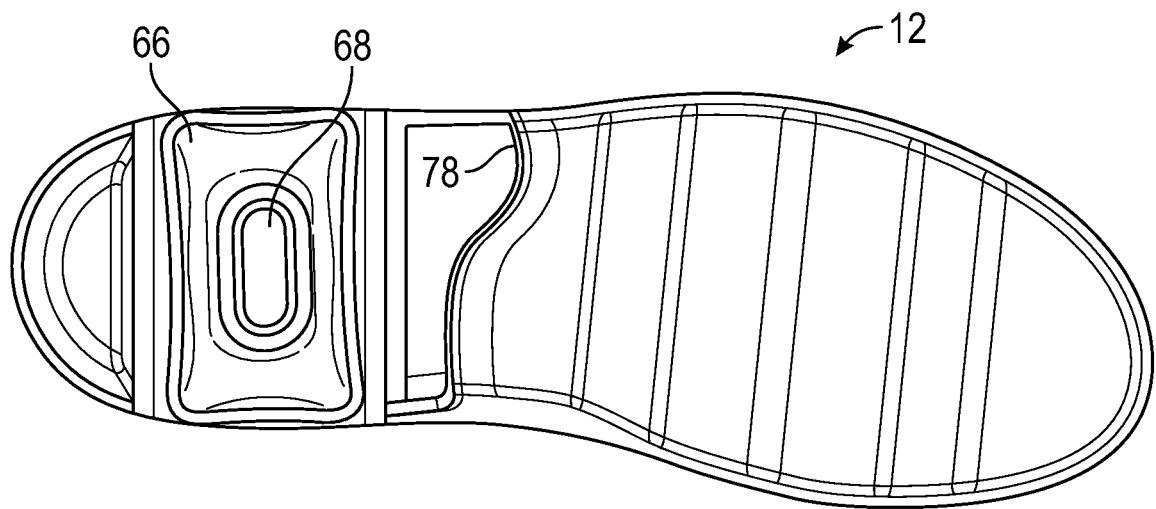
FIG. 13 is a bottom view of the midsole shown in FIG. 12.
Figure 14:
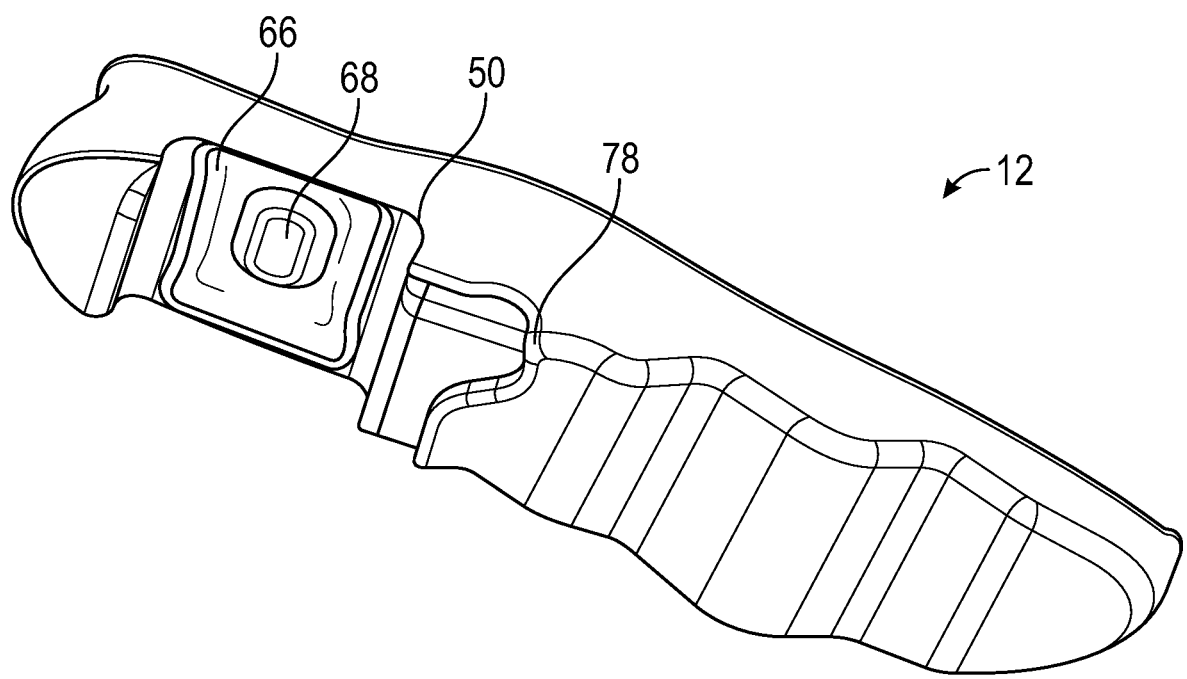
FIG. 14 is a bottom perspective view of the midsole shown in FIG. 12.

FIGS. 12-17 illustrate features of midsole 12 and outsole 14 and the manner in which they are shaped to receive the bladder elements described herein. FIG. 12 is a side view, FIG. 13 is a bottom view, and FIG. 14 is a bottom perspective view of an exemplary midsole 12. Midsole 12 defines a portion of window 50 by the shape of its cutout in the heel region. As shown in FIGS. 13 and 14, peripheral recessed portion 66 surrounds a raised surface, projection 68, that extends downward relative to recessed portion 66. Projection 68 is sized to be received within upper recessed portion 42 of bladder element 34. Thus, the shape of projection 68 can vary depending on the shape of upper recessed portion 42. For example, the exemplary projection of FIG. 14 is tapered towards the end to better accommodate the bladder element 34 shown in FIG. 4. In addition, projection 68 of the illustrated embodiment is oval shaped to correspond to the oval-shaped upper recessed portion 42 of bladder element 34. Different shapes and different numbers of projections are possible depending on the shape of the bladder element that is to be received in midsole 12.

Figure 15:
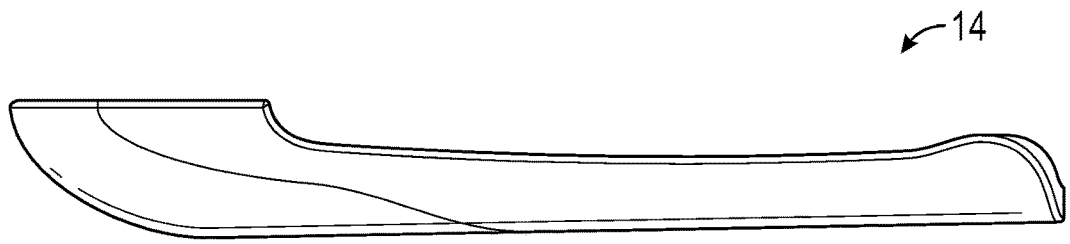
FIG. 15 is a side view of an outsole of an exemplary sole assembly.
Figure 16:
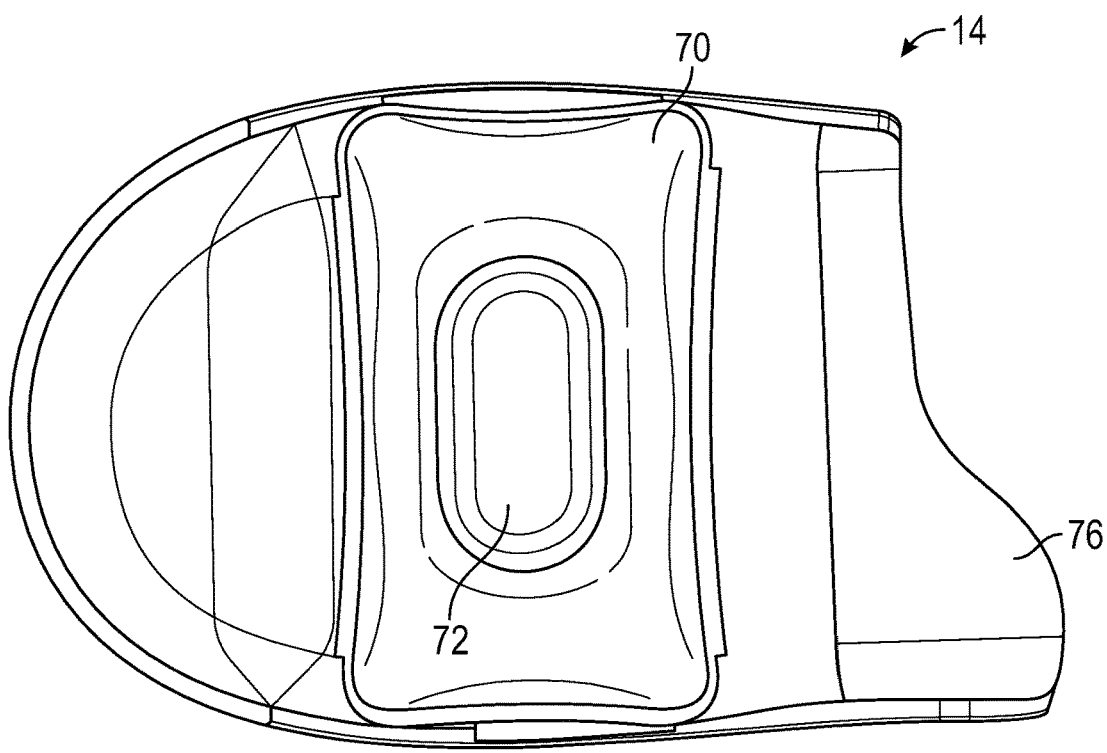
FIG. 16 is a top view of the outsole shown in FIG. 15.
Figure 17:
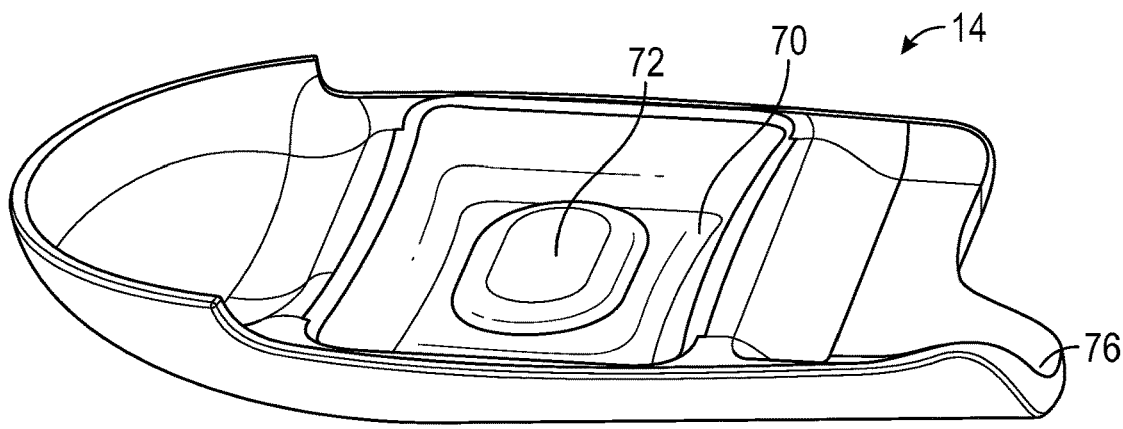
FIG. 17 is a top perspective view of the outsole shown in FIG. 15.

FIG. 15-17 illustrate an exemplary outsole 14 that can be secured to midsole 12, with the bladder system 16 positioned therebetween. FIG. 15 is a side view, FIG. 16 is a top view, and FIG. 17 is a top perspective view of outsole 14. As shown in FIGS. 16 and 17, a peripheral recessed portion 70 surrounds a central raised surface, projection 72, that extends upward relative to recessed portion 70. In the same manner as described above in connection with projection 68 and FIGS. 12-14, projection 72 is sized to be received within lower recessed portion 44 of bladder element 36. Thus, the shape of projection 72 can likewise vary depending on the shape of lower recessed portion 44.

The shape of outsole 14 can vary to provide a more secure attachment between outsole 14 and midsole 12. For example, as shown in FIG. 16, outsole 14 has a notched portion 76 that is sized to be received in a corresponding mating portion 78 of midsole 12 to provide a more secure fit between the midsole and outsole when the two are coupled together (e.g., with adhesives).

Figure 18:
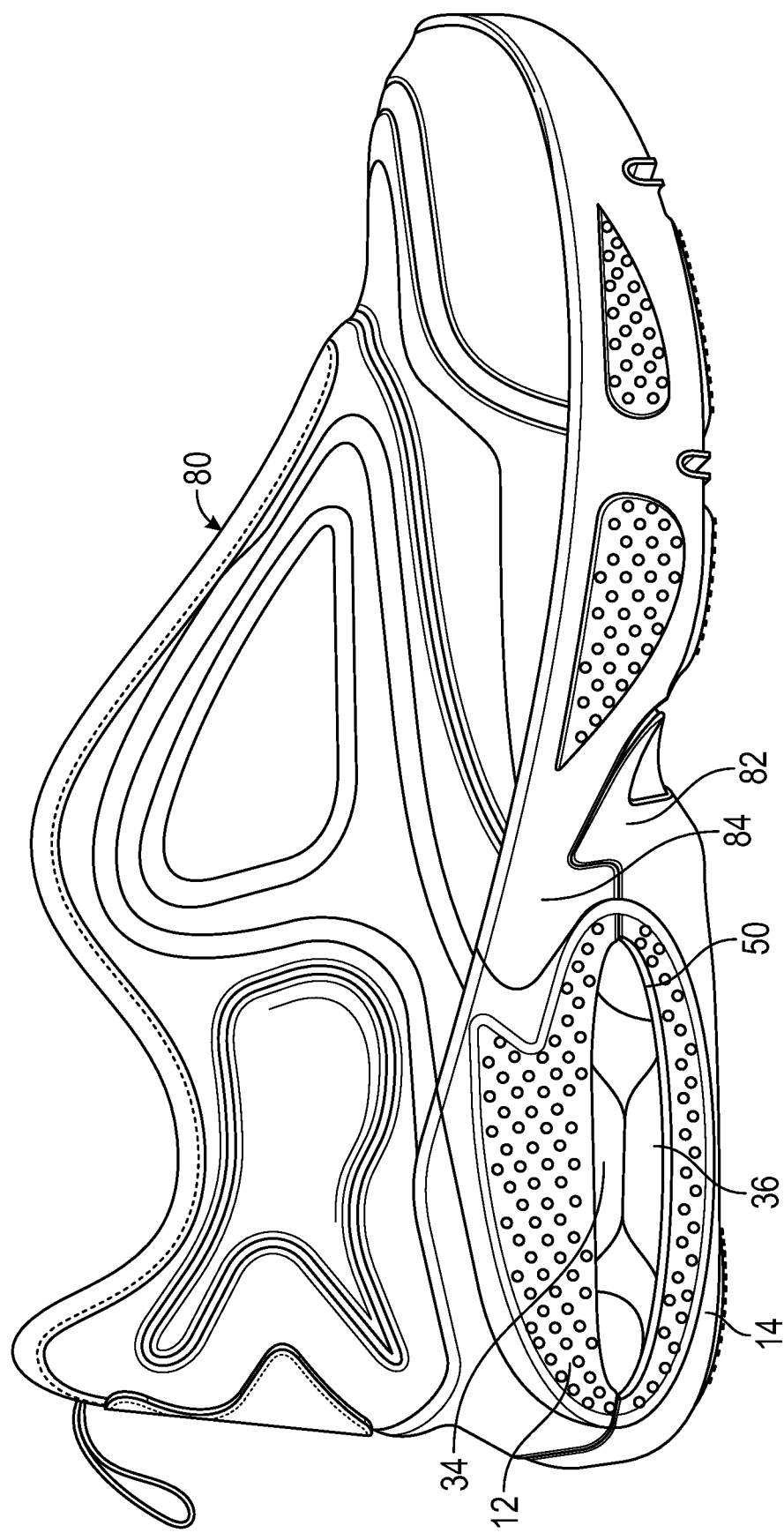
FIG. 18 is a side view of any article of footwear with a sole assembly and an exemplary cushioning system.
Figure 19:
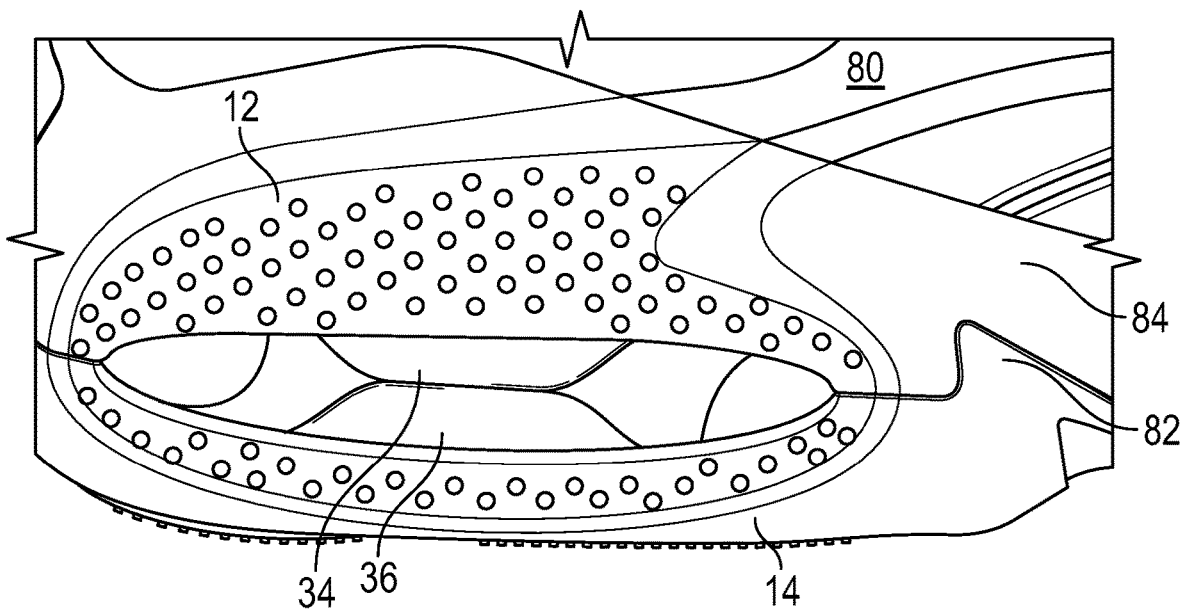
FIG. 19 is an enlarged view of a portion of a heel region of the article shown in FIG. 18.
Figure 20:
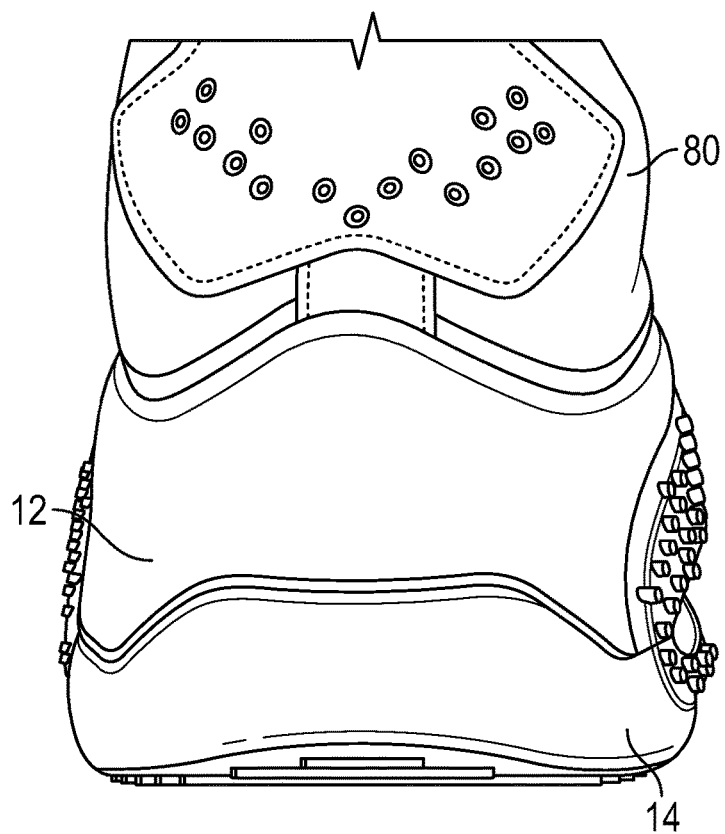
FIG. 20 is a rear view of the article shown in FIG. 18.
Figure 21:
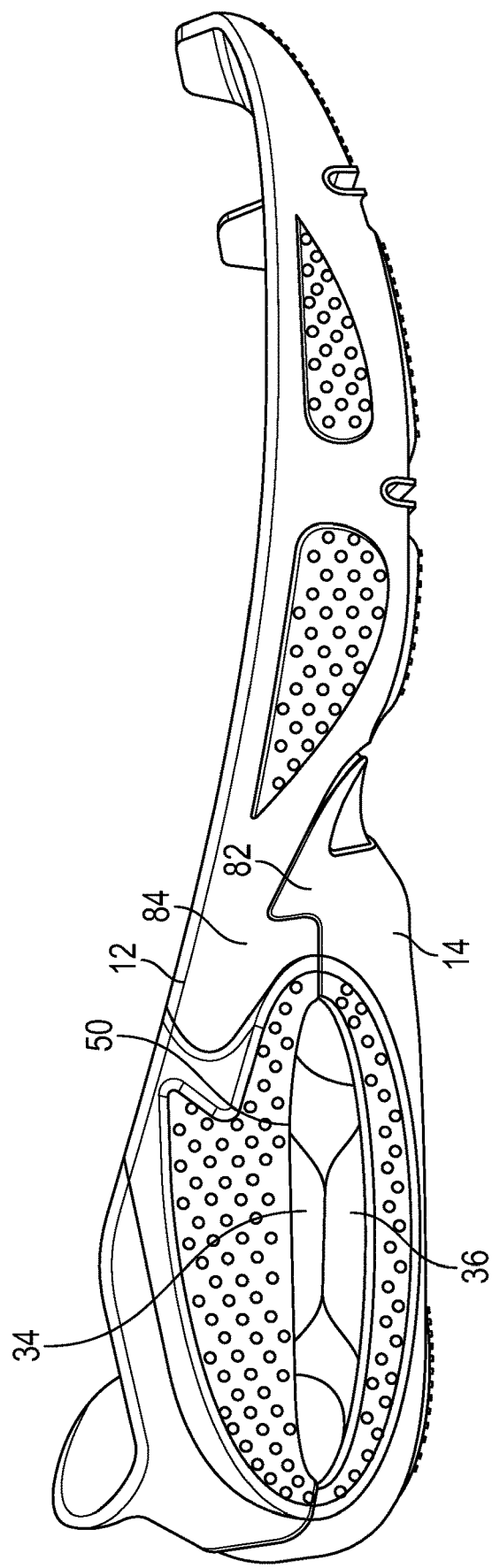
FIG. 21 is a side view of a sole assembly of the article shown in FIG. 18.

FIG. 18 illustrates an exemplary embodiment of an article of footwear having a sole assembly as described herein. As shown in FIG. 18, an upper 80 is secured to a sole assembly that includes midsole 12 and outsole 14. A bladder system, including bladder elements 34, 36, is secured within window 50 as described herein. As shown in FIGS. 18-21, outsole 14 can comprise a notched portion 82 which engages with corresponding portion 84 of midsole 12 to provide for a more secure coupling between the midsole and outsole.

It should be understood that the structure of bladder elements described herein can vary. For example, instead of a single fluid-filled chamber, the bladder elements can have multiple, discrete fluid-filled chambers. Such discrete fluid-filled chambers can be inflated at different pressures to create softer or stiffer areas of cushioning. In addition, as discussed above, more than one internal welds can be provided. For example, instead of a single weld area 64, two or more smaller spaced-apart weld areas can be formed with an intermediate fluid-filled region (either as a part of the main chamber of the bladder element or as a separate discrete chamber). If more than one weld areas are provided, a corresponding change can be made in the number of projections provided, as well as a corresponding change in their position and structure. Thus, for example, if the bladder element has two circular internal weld areas instead of a single oval-shaped weld area, two circular projections could be provided instead of a single oval-shaped projection.

In addition to the peripheral bond and one or more internal welds, the shape and characteristics of the bladder elements can be controlled by providing other structures within the bladder element such as tensile members. Additional details about the use of tensile members and/or other internal welds can be found in U.S. Pat. Nos. 5,083,361, 6,385,864, 6,571, 490, and 7,386,946, each of which is entirely incorporated herein by reference.

Bladder elements 34, 36 can also be formed of different colors and/or with different transparencies. For example, in some embodiments, the bladder elements can be substantially transparent. As used herein, a bladder element is "substantially transparent" if it has a luminous transmittance (i.e., a percentage of incident light that is transmitted) of at least 80 percent and haze (i.e., percentage of transmitted light that is scattered) of not more than 56 percent.

The various materials used for bladder elements 34, 36, and other embodiments of bladder elements discussed herein, may be substantially transparent. Those skilled in the art will readily understand a variety of methods to determine luminous transmittance and haze of an object, such as a bladder element. For example, the luminous transmittance and haze of the bladder element can be determined according to American Society for Testing and Materials (ASTM) Standard D1003-00, Standard Test Method for Haze and Luminous Transmittance of Transparent Plastics. Additionally, in some embodiments, the bladder elements may have a tinted color.

Although bladder elements 34, 36 are shown positioned in a heel region of the article of footwear, bladder element 34, 36 may instead or in addition be positioned in the midfoot region or the forefoot region.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. An article of footwear comprising:
    a midsole having a lower surface with a first recessed portion;
    an outsole coupled to the lower surface of the midsole, the outsole having an upper surface with a second recessed portion;
    a first bladder element having at least one chamber filled with a fluid, the first bladder element having an upper portion contacting the lower surface of the midsole and extending at least partially into the first recessed portion; and
    a second bladder element having at least one chamber filled with a fluid, the second bladder element having a lower portion contacting the upper surface of the outsole and extending at least partially into the second recessed portion,
    wherein the first bladder element has a first internal depression and the second bladder element has a second internal depression, and
    wherein the first recessed portion comprises a first projection that extends downward from the first recessed portion into the first internal depression and the second recessed portion comprises a second projection that extends upward from second recessed portion into the second internal depression.

2. The article of footwear of claim 1, further comprising:
    a window extending between a lateral side and a medial side of the article of footwear, the window being collectively defined by at least a lower edge of the midsole and an upper edge of the outsole;
    a first exposed portion of the first bladder element that is exposed by the window and a first unexposed portion of the first bladder element that is not exposed through the window; and
    a second exposed portion of the second bladder element that is exposed by the window and a second unexposed portion of the second bladder element that is not exposed through the window.

3. The article of footwear of claim 2, wherein the window is in a heel region of the article of footwear.

4. The article of footwear of claim 2, wherein the first unexposed portion includes a first peripheral bond of the first bladder element and the second unexposed portion includes a second peripheral bond of the second bladder element.

5. The article of footwear of of claim 1, wherein the first internal depression is formed from a first internal weld area of the first bladder element and the second internal depression is formed from a second internal weld area of the second bladder element.

6. The article of footwear of claim 1, wherein the outsole extends along an entire length of the article of footwear.

7. The article of footwear of claim 1, wherein the outsole forms only a portion of a ground-contacting surface of the article of footwear.

8. The article of footwear of claim 7, wherein the outsole extends across a heel region of the article of footwear.

9. The article of footwear of claim 7, wherein the outsole comprises a notched portion that engages with the midsole.

10. The article of footwear of claim 7, wherein the outsole is a first outsole member in a heel region of the article of footwear, and the first outsole member has a notched portion that engages with a mating portion of a second outsole member.

11. The article of footwear of claim 10, wherein the upper portion of the first bladder element is secured to the lower surface of the midsole and the lower portion of the second bladder element is secured to the upper surface of the outsole.

12. The article of footwear of claim 1, wherein a lower surface of the first bladder element is adhered to an upper surface of the second bladder element.

13. The article of footwear of claim 2, wherein the first and second exposed portions are spaced apart from a heel side of the window and from a forefoot side of the window, and
   a heel-side aperture is defined between the heel side of the window and the first and second exposed portions, and a forefoot-side aperture is defined between the forefoot side of the window and the first and second exposed portions.

14. The article of footwear of claim 1, further comprising an upper secured to the midsole and/or the outsole.

\* \* \* \* \*